United States Patent Office 3,577,475
Patented May 4, 1971

3,577,475
ISOMERIZATION OF C$_8$ ALKYL AROMATICS
Sigmund M. Csicsery, Lafayette, Calif., assignor to Chevron Research Company, San Francisco, Calif.
No Drawing. Filed Jan. 30, 1969, Ser. No. 795,359
Int. Cl. C07c 5/24, 15/08
U.S. Cl. 260—668         6 Claims

ABSTRACT OF THE DISCLOSURE

C$_8$ alkyl aromatic hydrocarbons are isomerized under isomerization conditions and in the presence of hydrogen with a catalyst comprising a porous solid carrier containing from 0.01 to 3 weight percent of a platinum group component and from 0.01 to 5 weight percent of a rhenium component.

BACKGROUND OF THE INVENTION

Field

The present invention relates to a method for isomerizing C$_8$ alkyl aromatics. More particularly, the present invention is concerned with a new and useful process for the selective production of a desired xylene from a mixture comprising xylene isomers having less than the equilibrium concentration of the desired isomer.

Prior art

C$_8$ alkyl aromatics find wide and varied application in industry. Because of the importance of the individual isomers, particularly the xylenes, it is often very important to be able to produce high concentrations of a particular isomer from a feed low in the particular isomer. It is particularly important to obtain orthoxylene, metaxylene and paraxylene in equilibrium concentrations from ethylbenzene. Furthermore it is important to convert a nonequilibrium mixture of the xylene isomers, which mixture is low in a desired xylene isomer, to a mixture approaching equilibrium concentrations.

Various catalysts and processes have been devised to accomplish the isomerization of C$_8$ alkyl aromatics. For example, it is well known in the art that catalysts such as aluminum chloride, boron fluoride, liquid hydrofluoric acid, and mixtures of hydrofluric acid and boron fluoride can be used to isomerize C$_8$ alkyl aromatic hydrocarbons. However the use of these catalysts generally involve long contact times, substantial amounts of disproportionation and low yields. Catalysts such as platinum or palladium on silica-alumina, and nickel sulfide on silica-alumina have also been proposed as isomerization catalysts for xylene production. However, generally, these catalysts result in a high degree of cracking of hydrocarbon components of the feed.

SUMMARY OF THE INVENTION

It has now been found that C$_8$ alkyl aromatics can be readily isomerized using a catalyst comprising a platinum group component and a rhenium component. The platinum group component is preferably present in an amount from 0.01 to 3 weight percent, and the rhenium component is preferably present in an amount from 0.01 to 5 weight percent, based on the finished catalyst. The catalyst can be used to isomerize ethylbenzene to produce ortho-, meta-, or paraxylenes. Also the catalyst can be used to isomerize a nonequilibrium mixture of xylene isomers, low in a desired isomer, to a mixture approaching equilibrium concentrations. The addition of a rhenium component to a catalyst comprising a platinum group component results in an active catalyst for the isomerization of C$_8$ alkyl aromatics. In the process of the present invention, side reactions, for example, disproportionation, dealkylation, etc., are reduced; the yield of the desired product is enhanced. The catalyst comprising a platinum group component and a rhenium component should be more selective for carrying out isomerization relative to coking than a catalyst comprising a platinum group component without rhenium.

DESCRIPTION OF THE INVENTION

The catalyst which finds use in the present invention comprises a platinum group component and a rhenium component in association with a porous solid carrier or support. The porous solid carrier can be, for example, silicon carbide, charcoal or carbon. Preferably the porous solid carrier is an inorganic oxide. A hgh surface area inorganic oxide is particularly preferred, e.g., an inorganic oxide having a surface area of 50 to 700 m.$^2$/gm., preferably at least 50 to 300 m$^2$/gm. Preferably the pore volume of the catalyst should be in the range of 0.3 to 1 ml./gm. The carrier can be a natural or a synthetically produced inorganic oxide or a combination of inorganic oxides. Typical acidic inorganic oxides or supports which can be used are the naturally occurring aluminum silicates, particularly when acid treated to increase the activity, and the synthetically-produced cracking supports, such as silica-alumina, silica-zirconia, silica-alumna-zirconia, silica-magnesia, silica-alumina-magnesia, and crystalline zeolitic aluminosilicates.

Particularly preferred catalyst supports for purposes of the present invention comprise silica, alumina, or fluorided alumina, or any combination of these materials. A preferred composition is a silica-alumina support having from 75 to 85 weight percent silica and the balance alumina. In preparing the catalyst support, care should be exercised in obtaining a high surface area material, i.e., a material with a surface area in the range of 50 to 700 m$^2$./gm., as previously indicated. The methods of preparing synthetic silica, alumina, or silica-alumina carriers have been published widely in both the patent art and the technological literature.

The catalyst should comprise a platinum group component in an amount of from 0.01 to 3 weight percent calculated on the basis of the metal and preferably from 0.1 to 1 weight percent. A platinum group component embraces all the members of Group VIII of the Periodic Table having an atomic weight of more than 100 as well as compounds and mixtures of any of these. Thus, the platinum group components are the Group VIII noble metals or compounds thereof. Platinum is preferred because of its better performance in isomerization. The concentration of the rhenium component in the finished catalyst composite is preferably in the range of from 0.01 to 5 weight percent and more preferably 0.1 to 2 weight percent. Suitable rhenium components include, besides the metal, rhenium chloride, rhenium fluoride, rhenium sulfide, rhenium sulfate, rhenium aluminate, oxides of rhenium, complex compounds of platinum and rhenium, and mixtures thereof. Regardless of the form in which the platinum group component and the rhenium component exist on the catalyst, whether as metal or compound, the weight percent of each is calculated as the metal.

The platinum group component and the rhenium component can be associated with the carrier or support by various methods. The platinum group component and the rhenium component can be disposed on the porous solid carrier and in intimate admixture with each other by a suitable technique such as ion-exchange, coprecipitation, impregnation, etc. It is not necessary that the platinum group component and the rhenium component be incorporated onto the porous solid carrier by the same technique. One of the components can be associated with the carrier by one method, for example, impregnation, and the other component associated with the carrier by another technique, for example, ion-exchange. Furthermore, the components can be associated with the carrier either sequentially or simultaneously. It is generally preferred that the components be associated with the porous solid carrier by impregnation, either sequentially or simultaneously. In general, the support is impregnated with an aqueous solution of a decomposable compound of a platinum group metal, or rhenium, in sufficient concentration to provide the desired quantity of the platinum group component and the rhenium component on the finished catalyst. Platinum, the preferred platinum group component, is preferably impregnated onto the porous solid support as chloroplatinic acid. Other platinum group compounds are ammonium chloroplatinates, polyamineplatinum salts, palladium chloride, etc. Rhenium is suitably incorporated onto the support by impregnation with perrhenic acid, Ammonium, or potassium, perrhenates, among others, can also be used.

The platinum group component and the rhenium component can be associated with the carrier at any stage of the catalyst preparation. For example, the components can be incorporated with a silica-alumina support while the silica-alumina is in the gel or sol from. The components are desirably uniformly distributed on the surface of the carrier, preferably in intimate admixture with each on the support.

Following incorporation of the carrier material with the platinum group component and rhenium component, the resulting composite is usually dried by heating at a temperature of, for example, no greater than about 500° F. and preferably at about 200 to 400° F. Thereafter the composite can be calcined at an elevated temperature, for example, up to about 1200° F. if desired.

The catalyst containing the platinum group component and the rhenium component is preferably heated at an elevated temperature in the presence of hydrogen, preferably dry halogen. In particular, it is preferred that the heating in the presence of hydrogen be accomplished at a temperature in the range of 600 to 1300° F., and preferably 600 to 1000° F.

The catalyst can be promoted for isomerization by the addition of halides, particularly fluoride. The halides apparently provide a certain amount of acidity to the catalyst which is beneficial for isomerization. Generally, the halide will be present in the amount of from 0.1 to 10 weight percent, preferably 0.1 to 5 weight percent. Halides can be incorporated onto the catalyst at any suitable stage of catalyst manufacture, e.g., prior to or following incorporation of the platinum group component and the rhenium component. Some halide is often incorporated by impregnating with the platinum group component; that is, for example, impregnation with chloroplatinic acid normally results in chloride addition to the carrier. Additional halide may also be incorporated onto the catalyst if desired; for example, fluoride may be incorporated by using hydrogen fluoride or ammonium fluoride, either in the gaseous form or in the water soluble form.

Feedstocks which may be utilized in the present process include, generally, certain hydrocarbon fractions containing at least one of the $C_8$ alkyl aromatic isomers. The feed may thus be a single $C_8$ alkyl aromatic hydrocarbon such as one of the group consisting of ortho-, meta-, or paraxylene or ethylbenzene or a mixture of the $C_8$ alkyl aromatic hydrocarbons. In general when a mixture of $C_8$ alkyl aromatic hydrocarbons is used, the ratio of isomers is other than the equilibrium proportion of the $C_8$ alkyl aromatic hydrocarbons. The mixture may consist exclusively of $C_8$ alkyl aromatic components or there may be present in the mixture other classes of hydrocarbons, such as paraffins, other aromatic hydrocarbons, olefins, naphthenes, etc. For economics of operation the feeds should contain no less than 5 volume percent $C_8$ alkyl aromatics. Preferably, the feed comprises substantially $C_8$ alkyl aromatics, i.e., at least 80 volume percent $C_8$ alkyl aromatics.

Suitable feeds comprising large volumes of $C_8$ alkyl aromatics can be obtained by conventional processes such as the catalytic reforming of petroleum naphthas. Fractional distillation and/or aromatics extraction from the reformate can accomplish the separation of a $C_8$ alkyl aromatic hydrocarbon fraction which contains ethylbenzene in addition to ortho-, meta-, and paraxylene. The $C_8$ alkyl aromatic hydrocarbon fraction thus obtained does not necessarily consist of an equilibrium concentration of the different isomer, but, rather, may be low in one or more of the desired isomers.

The isomerization of a feed comprising $C_8$ alkyl aromatic hydrocarbons is effected with the present catalyst at a temperature of from 400 to 1100° F. and preferably from 500 to 900° F. The use of a catalyst comprising a platinum group component and a rhenium component generally permits a low temperature to be used in the isomerization process to obtain a high extent of isomerization. The lower temperature desirably limits side reactions such as disproportionation, dealkylation, cracking, etc. The optimum temperature is of course dependent on the other variables of catalyst composition, contact time, pressure, etc.

The pressure for purposes of the present invention may be in the range of from 0 to 1000 p.s.i.g. It is preferred however that the pressure be less than 500 p.s.i.g. because of the equipment expense in handling high pressures. The preferred pressure for purposes of the present invention is in the range of 20 to 400 p.s.i.g.

The feed is preferably contacted with the catalyst at a liquid hourly space velocity in the range of 0.1 to 10 and preferably from 0.3 to 3.0.

The isomerization of $C_8$ alkyl aromatics is advantageously conducted in the presence of hydrogen. The presence of hydrogen helps accomplish the desired isomerization reactions which result in the shift of the $C_8$ aromatic composition towards the equilibrium mixture. The hydrogen supplied to the reaction zone for this purpose may be derived from free hydrogen specifically introduced from external sources to the reactor. Alternatively, the hydrogen may be supplied from in situ sources, such as hydrogen formed by dehydrogenation reactions which occur as a result of the process. Thus, paraffins and naphthenes which may accompany the $C_8$ alkyl aromatics in the feedstock undergo dehydrogenation and supply an in situ source of hydrogen, although at least a portion of the hydrogen present in the reaction zone is preferably continuously introduced into the reactor from extraneous or recycle sources and another portion continuously withdrawn to thereby remove sulfur and nitrogen impurities generally found in petroleum-derived feedstocks. The hydrogen may advantageously be mixed with the feed prior to introduction into the reaction zone or may be introduced into the reaction zone simultaneously with introduction of the feed thereto. Hydrogen to hydrocarbon molar ratios of 1/1 to 50/1 are useful; preferably the ratios are in the ratios of 5/1 to 30/1.

The process of the present invention permits the conversion to nearly equilibrium concentrations of $C_8$ alkyl aromatic isomers from a nonequilibrium mixture of isomers. Thus the present process permits the conversion of, for example, ethylbenzene to an equilibrium mixture containing ortho-, meta-, and paraxylenes. Furthermore, it is possible to obtain equilibrium concentrations of, for example, orthoxylene from a nonequilibrium mixture of isomers of meta- and paraxylene containing less than the equilibrium concentration of orthoxylene. Paraxylene is very often more desirable than the other xylene isomers; thus, the present invention is particularly useful in the production of paraxylene for mixtures comprising xylene isomers which mixture contains less than equilibrium concentration of paraxylene.

Following conversion of the $C_8$ alkyl aromatics to equilibrium or nearly equilibrium concentrations of the isomers, the particularly desired isomers may be recovered by several suitable methods which are known in the art; for example, paraxylene may be recovered from a mixture of xylene isomers and ethylbenzene by fractional distillation. Metaxylene may be extracted with an HF-BF$_3$ mixture. Orthoxylene, metaxylene and ethylbenzene can be separated by efficient fractional distillation procedures. It is understoood that after contacting a suitable feed with the catalyst and recovering the desired isomer, the remaining mixture may be recycled through the isomerization conversion zone to obtain further yields of the desired isomer.

The process of the present invention may be better understood by reference to the following examples.

EXAMPLE 1

A catalyst comprising 0.75 weight percent platinum, 0.76 weight percent rhenium, and 0.8 weight percent chloride in association with an alumina support was used in a C$_8$ alkyl aromatic isomerization process. The catalyst was treated, prior to isomerization, in hydrogen at 400° F. for 16 hours, after which the temperature was increased to 1500° F. over the next 6 hours and then maintained at 1500° F. for 20 minutes.

The isomerization reaction conditions included a pressure of 250 p.s.i.g., a hydrogen to hydrocarbon mole ratio of 10, and a liquid hourly space velocity varying between 0.5 to 2. The temperature of the reaction was maintained from 750 to 980° F. The feed used contained 93.6 volume percent C$_8$ aromatics, 0.1 volume percent benzene, 2.1 volume precent toluene, 4.1 volume precent C$_8$ paraffins and naphthenes. The C$_8$ alkyl aromatics portion consisted of the 18.6 percent ethylbenzene and 11.4, 54.5 and 9.0 percent ortho-, meta-, and paraxylenes, respectively.

The catalyst was found to be effective for the isomerization of the C$_8$ alkyl aromatics. In particular the disproportionation activity of the platinum-rhenium catalyst was significantly low. Thus the isomerization to disproportionation ratio was high.

EXAMPLE 2

A feedstock comprising pure ethylbenzene was contacted with a catalyst comprising 0.25 weight percent platinum and 0.1 weight percent rhenium associated with a silica-alumina support, the mole ratio of silica to alumina being 80/20. The catalyst was prepared by impregnating a silica-alumina support with tetraaminoplatinous nitrate and perrhenic acid, the volumes of the respective solutions being in sufficient amount to provide the desired concentrations of metal component on the finished catalyst. After impregnation, the impregnated silica-alumina support was dried at a temperature of about 150° F., calcined at 700° F., for one hour in air, then heated at about 930° F. for one hour in a hydrogen atmosphere.

Three separate runs were made at various isomerization conditions. The test conditions for each run as well as the results of the runs are given in the following table.

TABLE

| | Run 1 | Run 2 | Run 3 |
|---|---|---|---|
| Temperature, ° F | 650 | 650 | 750 |
| Pressure, p.s.i.g | 100 | 50 | 100 |
| Hydrogen/feed molar ratio | 19 | 20 | 20 |
| Ethylbenzene converted, weight percent | 91.3 | 61.5 | 67.0 |
| Xylene yield, weight percent of ethylbenzene converted | 29.3 | 47.5 | 67.0 |

The foregoing disclosure of this invention is not to be considered as limiting since many variations can be made by those skilled in the art without departing from the scope or spirit of the appended claims.

I claim:

1. A process for isomerizing C$_8$ alkyl aromatic hydrocarbons to a mixture having nearly equilibrium concentrations of said C$_8$ alkyl aromatic hydrocarbons comprising:
   contacting the hydrocarbons, hydrogen and a catalyst comprising 0.01 to 3 weight percent of a platinum group component, 0.01 to 5 weight percent of a rhenium component, and 0.1 to 5 weight percent halide associated with a carrier selected from the group consisting of silica and alumina under isomerization conditions including a hydrogen to hydrocarbon mole ratio from 5/1 to 30/1.

2. A process in accordance with claim 1 wherein the platinum group component is platinum and the carrier is alumina.

3. A process in accordance with claim 2 wherein the isomerization conditions include a temperature from 400° F. to 1100° F., a pressure from 20 p.s.i.g. to 400 p.s.i.g. and a liquid hourly space velocity from 0.1 to 10.

4. A process in accordance with claim 1 wherein the C$_8$ alkyl aromatic hydrocarbons comprise a non-equilibrium mixture of xylene isomers.

5. A process for producing xylene in nearly equilibrium concentrations from ethylbenzene, comprising.
   contacting ethylbenzene, hydrogen, and a catalyst including 0.01 to 3 weight percent of a platinum group component and 0.01 to 5 weight percent of a rhenium component associated with a support selected from the group consisting of silica, alumina, and silica-alumina, at a temperature from 500° F. to 900° F., a pressure from 20 p.s.i.g. to 400 p.s.i.g., a liquid hourly space velocity from 0.1 to 10, and a hydrogen to hydrocarbon mole ratio from 5/1 to 30/1; and
   recovering a xylene-containing product.

6. A process in accordance with claim 5 wherein the platinum group component is platinum and the support is silica-alumina containing 75 to 85 weight percent silica.

References Cited

UNITED STATES PATENTS 3,087,318  2/1963  Berger.
3,415,737  12/1968  Kluksdahl _____ 208—139

FOREIGN PATENTS 45,260  10/1961  Poland _____ 260—668

CURTIS R. DAVIS, Primary Examiner

Notice of Adverse Decision in Interference

In Interference No. 97,793 involving Patent No. 3,577,475, S. M. Csicsery, ISOMERIZATION OF $C_8$ ALKYL AROMATICS, final judgment adverse to the patentee was rendered Aug. 20, 1973, as to claims 1, 2 and 3.

[Official Gazette February 26, 1974.]